United States Patent [19]

Knowles

[11] Patent Number: 5,243,148
[45] Date of Patent: * Sep. 7, 1993

[54] TOUCH PANEL FOR AN ACOUSTIC TOUCH POSITION SENSOR USING SHEAR WAVE PROPAGATION

[75] Inventor: Terence J. Knowles, Hanover Park, Ill.

[73] Assignee: Exzec, Inc., Evanston, Ill.

[*] Notice: The portion of the term of this patent subsequent to Jan. 5, 2000 has been disclaimed.

[21] Appl. No.: 820,517

[22] Filed: Jan. 14, 1992

Related U.S. Application Data

[63] Continuation-in-part of Ser. No. 615,030, Nov. 16, 1990.

[51] Int. Cl.⁵ .............................................. G08C 21/00
[52] U.S. Cl. .............................................. 178/18
[58] Field of Search ................ 178/18, 19; 340/706, 340/712; 367/907

[56] References Cited

U.S. PATENT DOCUMENTS 5,072,427 12/1991 Knowles ........................ 367/907 X Primary Examiner—Stafford Schreyer
Attorney, Agent, or Firm—McAndrews, Held & Malloy, Ltd.

[57] ABSTRACT

An acoustic touch position sensor is shown in which a transducer coupled to a side of a substrate imparts a shear wave into the substrate for propagation along a first axis. A reflective array is disposed along the first axis to reflect portions of the shear wave along a plurality of parallel paths extending across a touch surface of the substrate to a second reflective array the axis of which is parallel to the axis of the first reflective array. The second reflective array reflects the shear waves incident thereto to a transducer mounted on the side of the substrate and responsive to shear waves propagated thereto for providing a signal representative of these shear waves. A touch on the substrate results in a partial absorption of the energy in the shear wave so as to produce a perturbation therein which is sensed to determine the axial position of the touch on the substrate. In another embodiment of the present invention a laminated touch panel is provided such that a back plate of any desired thickness is bonded onto the touch substrate. A nonshear wave coupling adhesive may be used to bond the back plate to the substrate. Alternatively, the back plate may be chosen such that the velocity at which acoustic waves propagate in the back plate is greater than the velocity at which acoustic waves propagate in the substrate. The touch panels of any of the embodiments shown may include means for suppressing spurious acoustic waves.

8 Claims, 11 Drawing Sheets

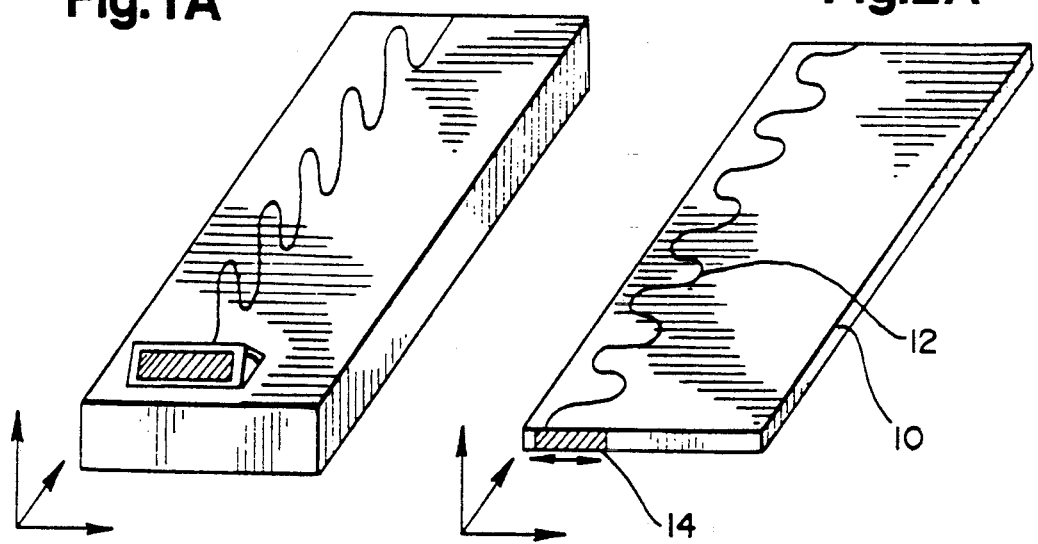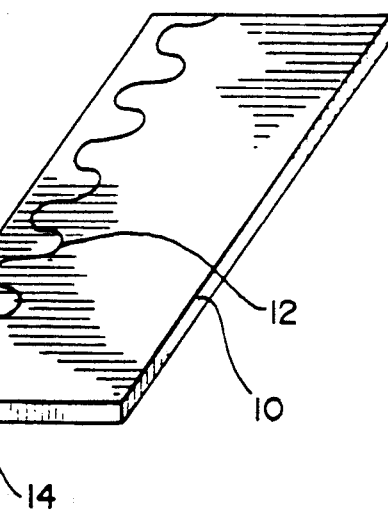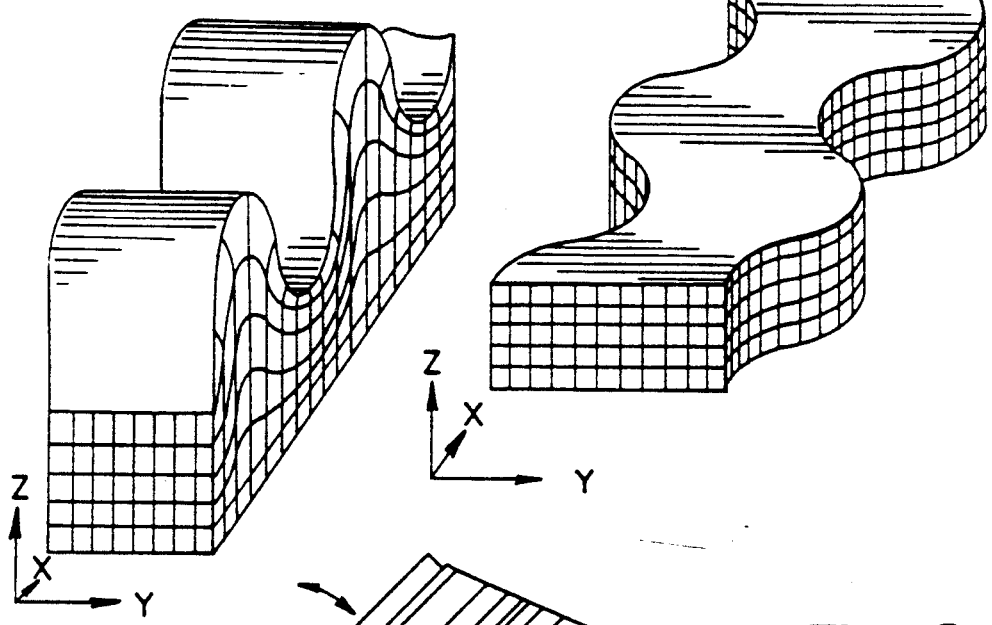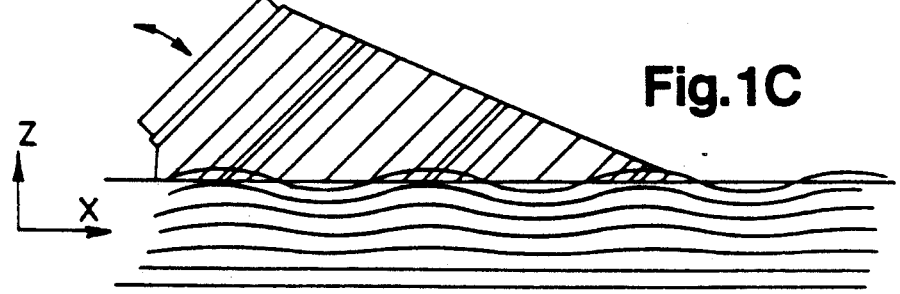

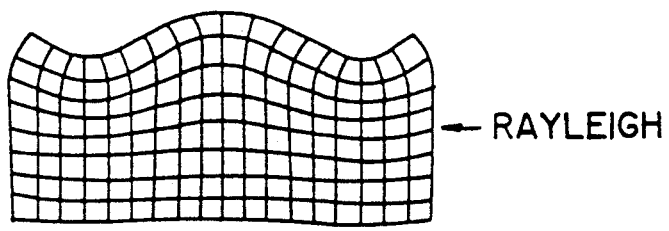
Fig. 1D — RAYLEIGH
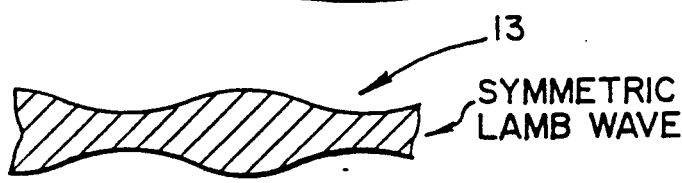
Fig. 1E — SYMMETRIC LAMB WAVE
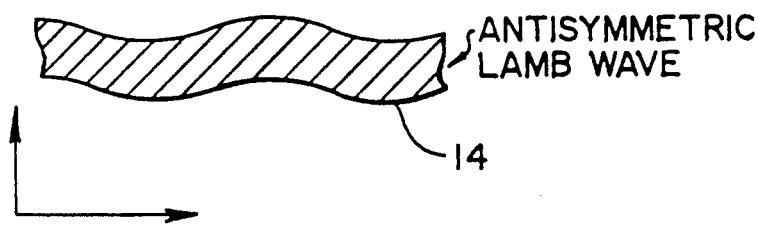
Fig. 1F — ANTISYMMETRIC LAMB WAVE
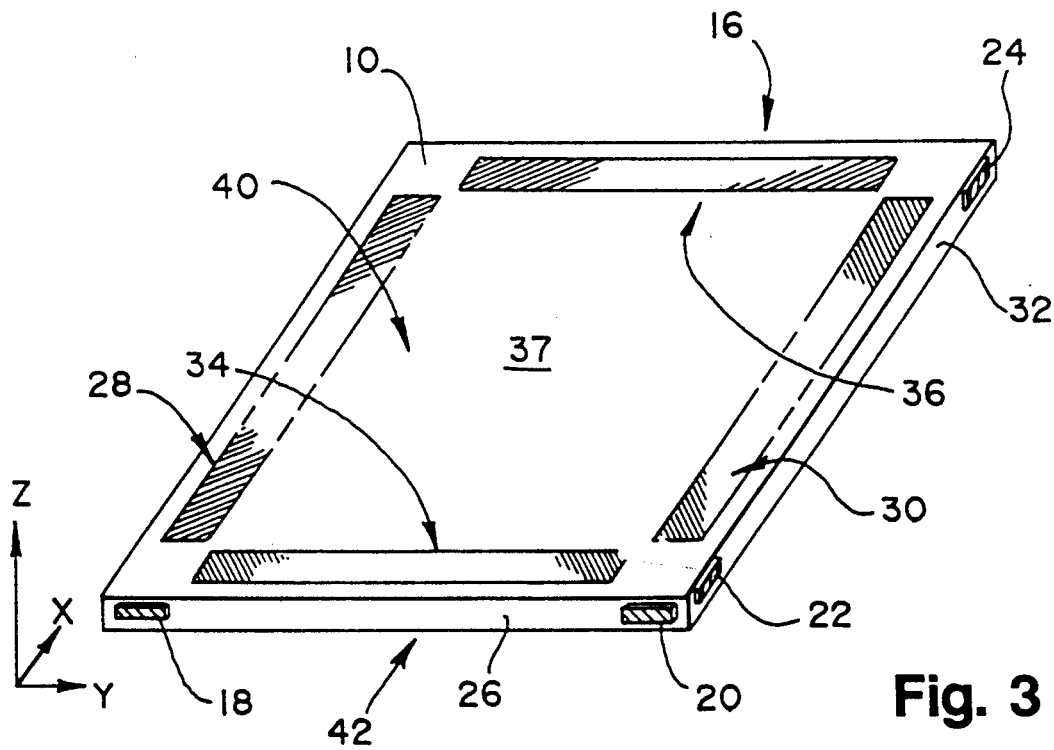
Fig. 3
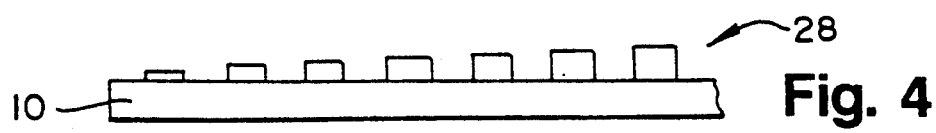
Fig. 4

TOUCH PANEL FOR AN ACOUSTIC TOUCH POSITION SENSOR USING SHEAR WAVE PROPAGATION

This is a continuation-in-part of U.S. patent application Ser. No. 07/615,030 filed Nov. 16, 1990.

TECHNICAL FIELD

The present invention relates to an acoustic touch position sensor and more particularly to a touch panel for use in an acoustic touch position sensor, the touch panel suppressing spurious acoustic waves and capable of being formed as a thin or thick panel while supporting shear waves for propagation therein.

BACKGROUND OF THE INVENTION

Acoustic touch position sensors are known to include a touch panel or plate having a group of transmitters positioned along a first edge of the panel for simultaneously generating Rayleigh waves that propagate through the panel in a X direction to a group of detectors positioned on a second edge of the panel opposite to the first edge. A group of transmitters is also positioned along a third edge of the panel for simultaneously generating Rayleigh waves that propagate through the panel in a Y direction to a group of detectors positioned on a fourth edge of the panel opposite to the third edge. Interruption of intersecting waves by touching the panel causes unique output signals to be developed at a X detector and a Y detector defining the point of intersection. Such an acoustic touch position sensor is shown in U.S. Pat. No. 3,673,327.

Acoustic touch position sensors are also known wherein only two transducers per axis are required. For each axis one transducer imparts a surface acoustic wave that propagates along the perpendicular axis on which a first reflective grating is disposed to reflect portions of the surface acoustic wave along plural parallel paths of differing lengths to a second reflective grating. The second reflective grating reflects the surface acoustic waves to a second transducer where the signals are received for processing. The reflective gratings associated with the X axis are perpendicular to the reflective gratings associated with the Y axes so as to provide a grid pattern to enable coordinates of a touch on the plate to be determined. Acoustic touch position sensors of this type are shown in U.S. Pat. Nos. 4,642,423, 4,644,100, 4,645,870, 4,700,176, 4,746,914 and 4,791,416.

Acoustic touch position sensors utilizing surface acoustic waves as taught by the above-mentioned patents have a number of problems which are more readily understood when the nature of the surface acoustic wave used in these sensors is considered. If as in the above mentioned patents, the touch plate consists of a uniform, non-piezo electric medium, and the acoustic wave is confined at or near a single surface such as an outer surface of the touch plate, the surface acoustic wave is known as a Rayleigh wave. These waves have X and Z components such that disturbed particles move elliptically in the X-Z plane. It is characteristic of these waves that the disturbance decays rapidly with depth, that is in the $-Z$ direction, so that the wave energy is essentially confined at or near the surface of the touch plate. Strictly, Rayleigh waves exist only in an infinitely thick medium. Waves in a uniform, non-piezoelectric medium of finite thickness that are confined to a single surface as shown in FIGS. 1A–1D are more precisely termed quasi-Rayleigh waves. Given a long enough propagating path in a medium of finite thickness, Rayleigh wave energy will not be confined at or near a single surface, but will transfer back and forth between the outer surfaces of the plate. A touch sensor according to the above mentioned patents, would be inoperable under these conditions because a touch in a region of one outer surface where complete transference of the wave to the opposite outer surface has taken place, will not disturb the wave, and is therefore undetectable. In practice, in order to provide a wave that is confined to a single surface, the thickness of the touch plate must be at least three to four times the wavelength of the wave imparted into the substrate, wherein the length and breadth of the touch plate are also limited.

If the thickness of the touch plate is for example two Rayleigh wavelengths or less, the waves emanating from the source transducers utilized in the above patents are clearly distinguishable from Rayleigh/quasi Rayleigh, and other surface acoustic wave (SAW) modes and are known as Lamb or Plate waves as shown in FIGS. 1E and 1F. Lamb waves exist in two groups of various orders, all of which propagate independently of one another. One group is characterized by particle displacement that is symmetric with respect to the median plane of the plate. The other group of Lamb waves is characterized by particle displacement that is anti-symmetric with respect to the median plane. In general a specific order within the symmetric Lamb wave group differs in phase and group velocity from the identical order of the anti-symmetric Lamb wave group. In particular with a plate thickness of approximately equal to two Rayleigh wavelengths, two modes of approximately equal amplitude are mainly excited, the zeroth order symmetrical Lamb waves and the zeroth order anti-symmetrical Lamb waves. As seen in FIGS. 1E and 1F, the symmetrical and anti-symmetrical Lamb waves are not confined to a single surface of the touch plate, but extend through the plate to the opposite surface thereof. When in phase however, that is initially at and close to the source of the waves, the two Lamb waves combine to produce a quasi Rayleigh wave, as can be seen from a comparison of FIGS. 1E and 1F to FIG. 1D. As the two Lamb wave modes travel further from the source, due to the differing phase velocities and the resultant phase difference between them, there is a complete transference of wave energy from the outer surface on which the transducer, generating the wave, is mounted to the opposite outer surface. This transference of energy between the outer surfaces of the plate occurs at regularly spaced intervals, making a touch plate having large enough dimensions for this transference to occur, unsuitable for a touch position sensor.

From the above, it is seen that touch position sensors as shown in the above mentioned patents utilizing surface acoustic waves and more particularly quasi-Rayleigh waves, as is necessary for these sensors to operate, are limited to relatively thick panels, i.e., panels having a thickness of three to four times the wavelength of the surface acoustic wave propagating therein. Further, quasi-Rayleigh waves are confined at and near a single surface. The consequence of using quasi-Rayleigh waves according to the above patents leads to several undesirable attributes, namely excessive sensitivity to contaminants or other materials abutting the touch panel, and excessive panel weight and thickness for many applications. The excessive sensitivity to contamination is due to the confinement of wave energy at or near the confining surface. As a result the quasi-Rayleigh wave energy or a large fraction thereof is absorbed by even modest amounts of surface contaminants. The effect of near or total absorption of wave energy by contamination, sealants or other materials abutting the plate, is to create acoustic shadows or blind spots extending along the axes that intersect the contaminant. A touch position sensor according to the above mentioned patents cannot detect touch if one or both coordinates is on a blinded axis. In a sense, touch panels utilizing quasi-Rayleigh waves are unduly sensitive to contamination or abutting materials. The scope for optimizing the performance of a touch sensor according to the above patents is limited because touch sensitivity and minimum touch panel thickness are not independent choices. In order to support a quasi-Rayleigh wave in a touch panel of reduced thickness, its other dimensions remaining the same, the wavelength must be reduced to preserve single surface confinement. It is characteristic of Rayleigh/quasi Rayleigh waves that their confinement depth is related to wavelength, with confinement depth decreasing as the wavelength is reduced. As a result, the wave is confined to a shallower region bounded by the surface, and the proportion of wave energy absorbed by a given absorbing medium is increased. Experimentally this is found to vary, approximately by the inverse square of the wavelength. As discussed previously, touch sensors according to above patents can be considered unduly sensitive for some applications, even for relatively thick panels, hence the effect of reducing touch panel thickness results in touch sensors even more sensitive to surface contamination and other abutments. Conversely, reducing sensitivity by increasing the quasi-Rayleigh wavelength results in increased panel thickness and weight. Losses in wave energy over distance as a result of air damping of the surface acoustic wave is also significant since surface acoustic waves are confined to the surface of the touch plate. The energy losses due to air damping further limit the size of the touch plate.

As shown in FIGS. 1A and C, surface acoustic waves are imparted into a touch plate utilizing a transducer mounted on a wedge that is in turn mounted on the touch surface of the plate wherein the transducer vibrates in the direction shown to produce a compressional bulk wave that propagates in the wedge to impart a surface acoustic wave in the touch plate. This type of wave generating device has several drawbacks. Because the device must convert a compressional bulk wave to a surface acoustic wave, the efficiency of the device is not as high in practice as if the transducer produced waves were of the same type as those imparted into the plate, i.e., via direct conversion. Also, because the wedge extends above the plate, it must be accommodated for in mounting the plate. Wedges are typically made of plastic thus creating a difficulty in bonding the wedge to a glass plate. Further, the transducer must be bonded to the wedge and the wedge then bonded to the touch plate. Because problems with reliability increase with the number of bonds required, this surface acoustic wave generating device is not as reliable as other wave generating devices requiring fewer bonds.

Although acoustic waves other than surface acoustic wave can propagate in a solid, such waves including Lamb waves and shear waves, heretofore these other acoustic waves were thought to be unsuitable for a touch position sensor. Lamb waves were thought unsuitable because they are dispersive, varying in phase and velocity, so as to interfere with one another. Shear waves were thought unsuitable because a touch on a plate in which shear waves are propagating absorbs only a small percentage of the shear wave energy intercepted by a touched surface whereas a touch on a plate in which a surface acoustic wave is propagating absorbs a much greater percentage of the intercepted surface acoustic wave energy. More particularly, the percentage of intercepted energy absorbed by a given touch can be over ten times greater for a surface acoustic wave than it is for a zeroth order horizontally polarized shear wave for practical touch plate thickness. Since shear waves are not nearly as responsive to touch as surface acoustic waves, shear waves were not thought practical for a touch position sensor.

SUMMARY OF THE INVENTION

In accordance with the present invention, the disadvantages of prior acoustic touch position sensors as discussed above have been overcome. The touch position sensor of the present invention utilizes a shear wave that propagates in a substrate along a plurality of paths of differing lengths and differing positions wherein a touch on the substrate forms a perturbation the time of occurrence of which is sensed to determine the position of the touch on the substrate.

Shear waves have several unexpected advantages over surface acoustic waves which compensate for the lower percentage of total energy absorbed by a touch. One such unexpected advantage is that a shear wave can be generated and received with greater efficiencies than a surface acoustic wave on a non-piezoelectric substrate of the kind suitable for touch plates. This results in a signal with a substantially greater signal to noise ratio so that with the aid of signal processing a shear wave touch position sensor results wherein the sensor is at least as sensitive to touch as a surface acoustic wave touch position sensor.

In fact, it is because shear waves are not confined to the surface of the substrate, as are surface acoustic waves, but extend throughout the entire thickness of the substrate that several advantages result from a shear wave touch position sensor. One advantage is that contaminates or other materials abutting the surface of a shear wave touch position sensor do not result in blind spots or significant shadows extending along the axes that intersect the contaminate or matter. Therefore, shear wave touch position sensors are suitable for use in environments that surface acoustic wave sensors may not be. Shear wave touch position sensors are also sensitive to a touch on both the top and bottom surfaces of the su_ _ _ whereas surface acoustic wave sensors are sensitive to touch only on the surface of the substrate on which the transducer is mounted. Further, the losses due to air damping are less in a shear wave touch position sensor than in a surface acoustic wave touch position sensor so that the shear waves can travel greater distances than a surface acoustic wave for a given reduction in signal strength.

Another major advantage of a shear wave touch position sensor is that virtually the only limit on the thinness of the touch panel is its structural integrity making it extremely practical for applications where the weight of the touch sensor must be minimized. In fact, it is desirable that the thickness of the substrate in a shear wave touch position sensor be less than that capable of supporting a Rayleigh wave since the thinner the substrate, the greater the fractional sensitivity.

Although it is desirable that the touch substrate in which the shear waves are supported be thin, the substrate may be bonded to another plate of any thickness in accordance with the present invention without appreciably affecting the sensitivity of the touch sensor.

More particularly, the touch panel of the present invention includes a touch substrate capable of supporting shear waves for propagation therein. In order to support the desired shear waves while avoiding excessive higher order modes or overtones, the thickness of the substrate is made less than approximately two times the wavelength of the shear wave imparted into the substrate. The thickness of the substrate is also chosen so that it is either less than or greater than one wavelength of the shear wave imparted into the substrate.

In order to provide touch panels, the thickness of which is greater than two wavelengths of the shear wave imparted into the substrate, a laminated touch panel may be provided wherein a back plate of any desired thickness is bonded onto the touch substrate. In one embodiment of the present invention the adhesive bonding the substrate to the back plate is a nonshear wave coupling adhesive. In a second embodiment, the back plate is chosen such that the velocity at which acoustic waves propagate in the back plate is greater than the velocity at which acoustic waves propagate in the substrate.

In accordance with the present invention, the touch panel further includes means for suppressing spurious acoustic waves. These and other objects, advantages and novel features of the present invention, as well as details of an illustrated embodiment thereof, will be more fully understood from the following description and the drawing.

BRIEF DESCRIPTION OF THE DRAWING

FIG. 1A is a perspective view of a prior art surface acoustic wave propagating plate;

FIG. 1B is a greatly exaggerated perspective view of a surface acoustic wave traveling in the prior art plate of FIG. 1A;

FIG. 1C is a side cross sectional view of the prior art plate shown in FIG. 1A illustrating the nature of the waves generated in the plate;

FIG. 1D is an illustration of a Rayleigh wave;

FIG. 1E is an illustration of a symmetrical Lamb wave;

FIG. 1F is an illustration of an anti-symmetric Lamb wave;

FIG. 2A is a perspective view of a shear wave propagating plate in accordance with the present invention;

FIG. 2B is a greatly exaggerated perspective view of a shear wave traveling in the plate of FIG. 2A;

FIG. 3 is a perspective view of a shear wave touch position sensor in accordance with a first embodiment of the present invention;

FIG. 4 is an illustration of the variable height reflective elements forming a reflective array as shown in FIG. 3;

DETAILED DESCRIPTION OF THE PREFERRED EMBODIMENT

Figure 5:
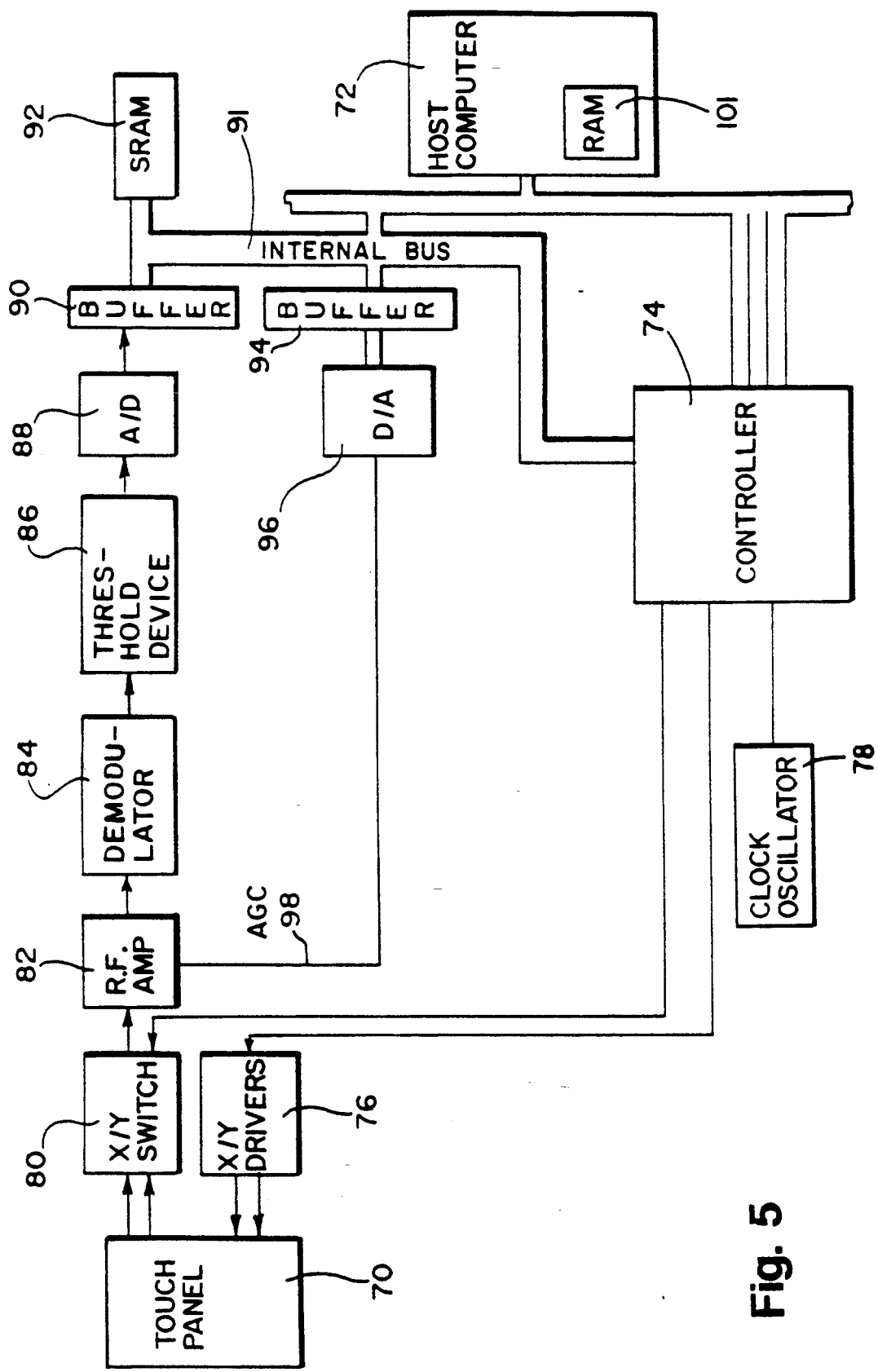
FIG. 5 is a block diagram illustrating the signal processing portion of the touch position sensor illustrated in FIG. 3.

The touch position sensor of the present invention includes a substrate 10 that is capable of propagating a shear wave 12 as shown in FIG. 2A. The substrate 10 may be formed of tempered or frosted glass, plastic, metal or ceramic. The substrate 10 may further be formed as a flat plate as shown or the substrate may be curved.

In order to induce a shear wave propagating in the X direc_____ · piezoelectric transducer 14 is bonded on to an edge of the substrate perpendicular to the axis of propagation, X. The transducer 14 is responsive to a drive signal for vibrating along the Y axis wherein a horizontal shear wave 12 is induced in the transducer 14 and coupled thereby directly to the substrate 10. As shown in FIG. 2B, the shear wave 12 imparted into the substrate 10 is not confined to a single surface of the substrate 10, but extends throughout the entire thickness of the substrate 10. The particles of the shear wave move only in the Y direction. It is noted that shear waves may be symmetric or anti-symmetric about the median plane. In the preferred embodiment of the present invention a non-dispersive shear wave is employed. More particularly, this non-dispersive mode is the zeroth order of the following plate solution for a wave traveling in the X direction.

$$U_x = 0$$

$$U_y = A \exp[2\pi i(x/\lambda - ft)]$$

$$U_z = 0$$

where Ux, Uy, Uz are displacement components in the x, y and z directions respectively, A is a constant, $\lambda$ is the wavelength, and f is the number of cycles per second. This shear wave is designated herein as the zeroth order horizontally polarized shear wave or Zohps wave. (See Physical Acoustics, Ed. W. P. Mason, VolI-Part A P120, *Academic Press* 1964, New York and London).

A touch position sensor 16 in accordance with a first embodiment of the present invention is shown in FIG. 3 having a pair of transmitting and receiving transducers 18, 20 and 22, 24 associated with each axis for which a coordinate is desired to be determined. Although the touch position sensor 16 has four transducers 18, 20 and 22, 24 respectively associated with the X axis and Y axis so that both X and Y coordinates of a touch may be determined, if only a single coordinate is desired, for example a coordinate along the X axis, then the transducers 22 and 24 associated with the Y axis may be eliminated.

Returning to FIG. 3, in accordance with the present invention, the piezoelectric transducers 18, 20, 22 and 24 are bonded on to the sides 26 and 32 of the substrate 10 by means of a conductive frit. More particularly, the transducers are soldered to conductive frit with indium based solder. Other brazing techniques may also be used with various metals to bond the transducers to the frit. The conductive frit forms a contact that may extend around the corner of the substrate 10 between the transducers 20 and 22 to eliminate the need for separate ground wires connected to these two adjacent transducers. The height of the transducers 18, 20, 22 and 24 and the height of the conductive frits bonding the transducers to the substrate 10 are equal to the thickness of the substrate 10 so that substantially only symmetric modes of the shear wave is generated in the substrate 10. The piezoelectric transducers 18, 20, 22 and 24 are thin so as not to protrude outwardly from the sides 26 and 32 of the substrate to any appreciable extent. Further, since the transducers do not protrude above or below the top or bottom surfaces 40 and 42 of the substrate 10, the substrate 10 may be mounted in any fixture accommodating a plate of the same size without making special accommodations for the transducers.

In order to define the X axis, the X transmitting transducer 18 is bonded on to an edge 26 of the substrate 10 wherein the edge 26 is perpendicular to the X axis. The transmitting transducer 18 vibrates along the Y axis to impart a shear wave that travels along the X axis to an array 28 of reflective elements as described in detail below. Each element of the reflective array 28 is disposed at an approximately 45° angle so as to reflect a portion of the shear wave incident thereto in the Y direction to a corresponding reflective element disposed in a reflective array 30. The array 30 of reflective elements is disposed along an axis that is parallel to the axis along which the reflective array 28 is disposed. Each of the reflective elements in the array 30 is disposed at a 45° angle with respect to the axis of the array 30 so as to reflect a shear wave propagating in the Y direction from the reflective array 28 to the receiving transducer 20. The receiving transducer is bonded to the side 26 of the substrate 10 perpendicular to the axis of the array 30 so as to sense shear waves reflected thereby to the array 30 to provide a signal representative of the shear waves.

Similarly, in order to define the Y axis, the Y transmitting transducer 22 is bonded on an edge 32 of the substrate 10 wherein the edge 32 is perpendicular to the Y axis. The transmitting transducer 22 vibrates along the X axis to impart a shear wave that travels along the Y axis to an array 34 of reflective elements as described in detail below. Each element of the reflective array 34 is disposed at an approximately 45° angle so as to reflect a portion of a shear wave incident thereto in the X direction to a corresponding reflective element disposed in a reflective array 36. The array 36 of reflective elements is disposed along an axis that is parallel to the axis along which the reflective array 34 is disposed. Each of the reflective elements in the array 36 is disposed at a 45° angle with respect to the axis of the array 36 so as to reflect a shear wave propagating in the X direction from the reflective array 34 to the receiving transducer 24. The receiving transducer 24 is bonded to the side 32 of the substrate 10 perpendicular to the axis of the array 36 so as to sense shear waves reflected thereto by the array 36 to provide a signal representative of the shear waves.

The reflective elements in the arrays 28 and 30 define a number of paths of differing lengths such that shear waves reflected by each successive element in the array 28 follow paths to the receiving transducer 20 that are progressively longer. Portions of each of the paths defined by the reflective arrays 28 and 30 extend in parallel across the substrate 10 in the Y direction, each parallel path portion defining an X coordinate. Similarly, the reflective elements in the arrays 34 and 36 define a number of paths of differing lengths such that shear waves reflected by each successive element in the array 34 follow paths to the receiver 24 that are progressively longer. Portions of each of the paths defined by the arrays 34 and 36 extend in parallel across the substrate 10 in the X direction, each parallel path portion defining a Y coordinate.

Figure 8:
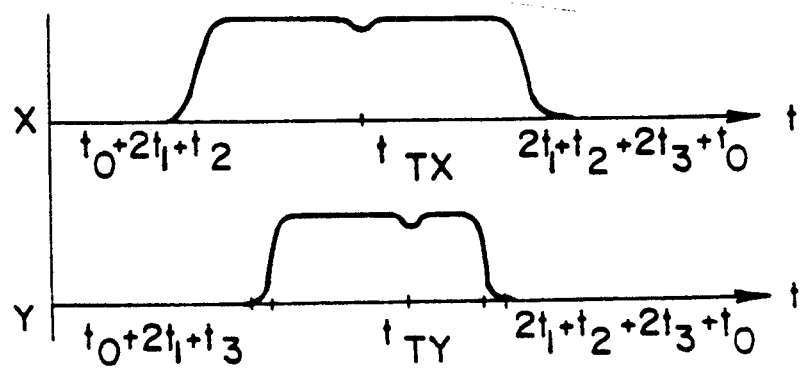
FIG. 8 is a graph illustrating the X and Y waveforms generated by the touch position sensor of FIG. 3.

The X and Y signals generated by the respective receiving transducers 20 and 24 are depicted in FIG. 8 wherein reflective arrays 28, 30, 34 and 36 of variable height are employed to provide X and Y signals whose amplitudes remain substantially constant with time as discussed below. With regard to the X axis signal, if a shear wave is generated by the transducer 20 beginning at time $t_0$, the first shear wave received by the transducer 20 occurs at a time equal to $2t_1 + t_2 + t_0$ where $t_1$ is the time it takes a shear wave to travel from the substrate side 26 to the first reflective element in the array 28 and also the time that it takes the shear wave to travel from the first reflective element in the array 30 to the side 26 where it is sensed by the transducer 20. In the equation, $t_2$ represents the time it takes a shear wave to travel across the substrate 10 in the Y direction. The shear wave portion reflected by the last element in the reflective array 28 and received by the last element in the reflective array 30 is received by the transducer 20 at a time equal to the $2t_1 + t_2 + 2t_3 + t_0$ wherein $t_3$ represents the time it takes a shear wave to travel in the X direction between the first element of the reflective array 28 and the last element of the reflective array 28 as well as the time it takes a shear wave to travel in the X direction between the last element of the array 30 and the first element thereof. Similarly, if the transducer 22 generates a shear wave at time $t_0$, the receiving transducer 24 receives the first shear wave reflected by the arrays 34 and 36 at a time $2t_1 + t_3 + t_0$ and the receiving transducer 24 receives the last shear wave reflected by the arrays 34, 36 at time $2t_1 + t_3 + 2t_2 + 2_0$. Each value of $t_x$ between $2t_1 + t_2 + t_0$ and $2t_1 + t_2 + 2t_3 + 2_0$ represents a coordinate along the X axis; whereas, each time value of $t_y$ between $2t_1 + t_3 + t_0$ and $2t_1 + t_3 + 2t_2 + t_0$ represents a coordinate along the Y axis. It is noted that in the preferred embodiment the time at which the drive signal is applied to the Y axis transmitting transducer 22 is at a time subsequent to the application of the drive signal to the X axis transmitting transducer 18 and also subsequent to the time that the X axis receiving transducer 20 receives the last shear wave reflected by the arrays 28 and 30.

A touch on the outer, i.e., top surface 40 or on the inner, i.e., bottom surface 42 of the substrate 10 will absorb a portion of the energy in the shear waves passing underneath or above the touched position. This partial absorption of energy creates a perturbation in the shear wave whose energy is absorbed, the perturbation being reflected in the amplitude of the signals generated by the receiving transducers 20 and 24. For example, the coordinates of a touch on the top or bottom surfaces of the substrate 10 are represented by the times of occurrence of the perturbations in the X and Y transducer signals depicted respectively at $t_{Tx}$, $t_{Ty}$ in FIG. 8.

The control system of the touch position sensor as shown in FIG. 5 controls the application of the drive signals to the transducers 18 and 22 and determines the coordinates of a touch on the substrate 10 from the times of occurrence $t_{Tx}$ and $t_{Ty}$ of the signal perturbations representing the touch. The touch panel 70 as shown in FIG. 5 is comprised of the substrate 10, the X and Y transmitting transducers 18 and 20, the X and Y receiving transducers 20 and 24 and the reflective arrays 28, 30, 34 and 36. A host computer 72 that may include a microprocessor or the like initiates a scan cycle of the touch panel 70 by instructing a controller 74. The controller 74 is responsive to an initiate scan cycle instruction from the computer 72 to apply a drive signal to the X transmitting transducer 18 through an X driver 76 wherein the timing of the controller 74 is determined by a clock/oscillator 78. The drive signal applied to the transducer 18 is a burst drive signal in the form of a sine wave the number of cycles of which is equal to the width of the array 28 divided by a constant. The controller 74 also sets an X/Y switch 80 to the X position to couple the X receiving transmitter 20 to an R.F. amplifier 82. As the shear waves reflected by the arrays 28 and 30 are sensed by the transducer 20, the transducer 20 generates an X axis signal representative thereof that is coupled to the amplifier 82 through the switch 80. The amplified X axis signal output from the amplifier 82 is applied to a demodulator 84 that removes the alternating component from the amplified X axis signal to provide an envelope waveform such as depicted in FIG. 8. The output of the demodulator 84 is coupled to a threshold device 86 that provides an output signal which follows the input if the input to the device 86 is above the threshold thereof. The output of the threshold device 86 does not however follow the input signal if the input is below the threshold thereof. The output of the threshold device 86 is applied to an analog to digital converter 88 the output of which is coupled by a buffer 90 to an internal bus 91. The controller 74 stores the digital data output from the analog to digital converter 88 in a static RAM 92 such that a value representing the amplitude of the X axis signal at each point in time $t_x$ as sampled by the analog to digital converter 88 is stored in a location in the static RAM 92 representing the point in time. After the X axis data is stored in the static RAM 92, the controller 74 controls the Y driver 76 to apply a burst drive signal to the Y axis transmitting transducer 22 of the touch panel 70. The controller 74 also changes the state of the X/Y switch 80 so that the Y receiving transducer 24 is coupled to the R.F. amplifier 82. The digital data representing the Y axis signal as output from the analog to digital converter 88 is likewise stored in the static RAM 92 such that a value representing the amplitude of the Y axis signal at each point in time $t_y$ as sampled by the analog to digital converter 88 is stored in a location in the static RAM representing the point in time.

Figure 9:
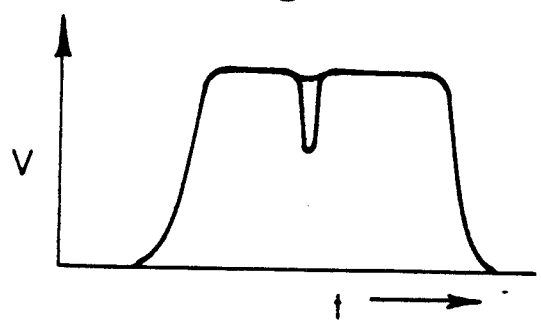
FIG. 9 is a graph illustrating the difference in fractional sensitivity of a zeroth order horizontally polarized shear wave as compared to a surface acoustic wave.

During an initialization process, the host computer 22 is responsive to the values stored in the static RAM 92 for an untouched panel 70 to set the gain on the R.F. amplifier 82 via a buffer 94 the output of which is coupled to a digital to analog converter 96. The threshold device 86 in combination with the automatic gain control provided by the feedback loop 98 shifts the zero level of the base band response to increase the difference in amplitude of the transducer's output signal representing a touched point and an untouched point so that a touched point may be more easily detected. This technique is possible since the signal to noise ratio of the Zohps waves generated is extremely high. This feature thus partially compensates for the difference in fractional sensitivity of a Zohps wave as compared to a surface acoustic wave as illustrated in FIG. 9.

Figure 6:
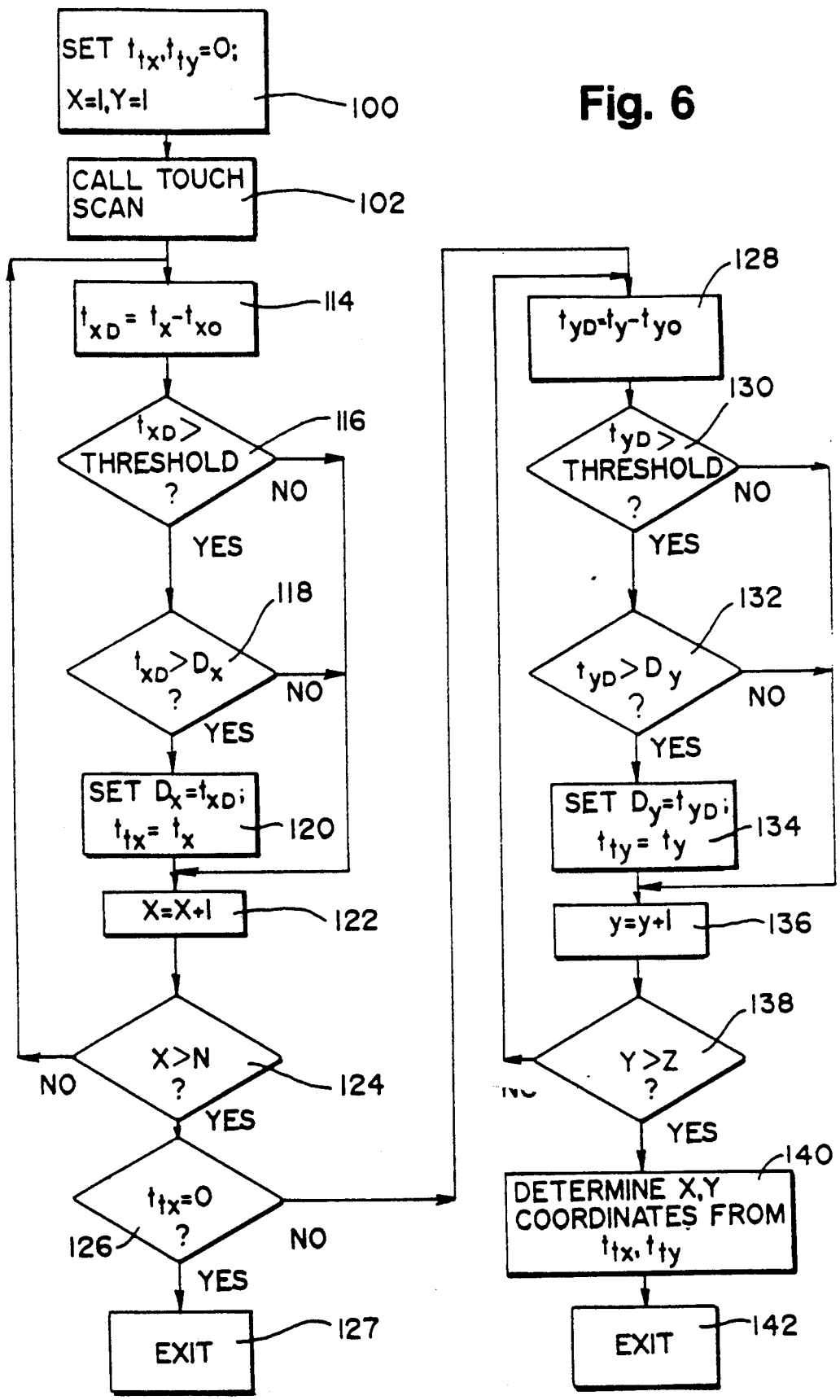
FIG. 6 is a flow chart illustrating the position determining operation of the sensor of the present invention.
Figure 7:
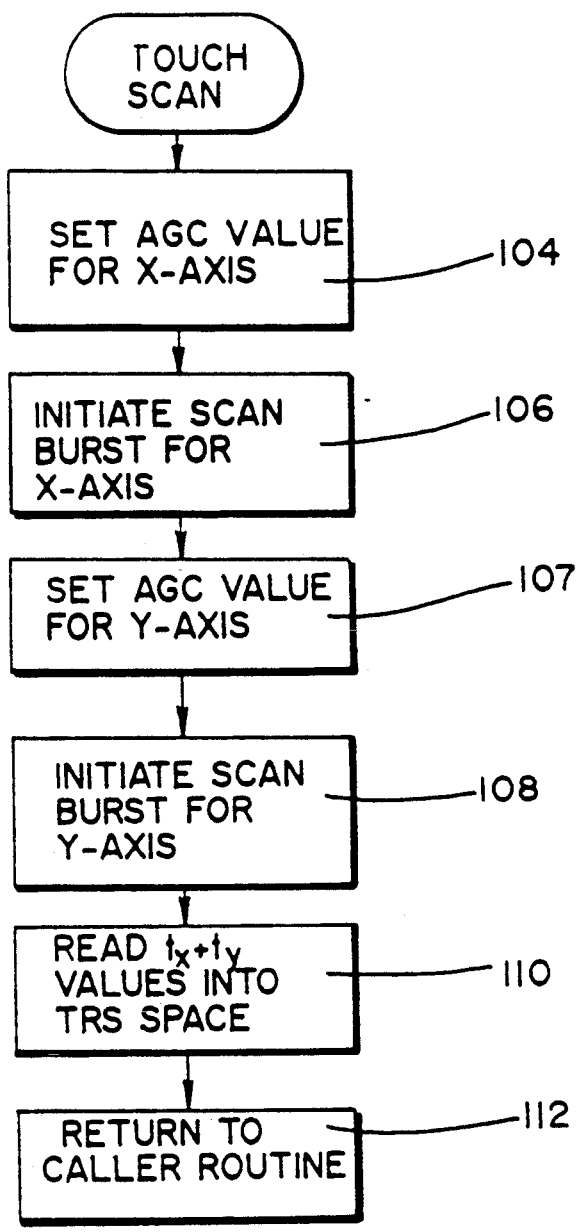
FIG. 7 is a flow chart illustrating the touch scan routine called by the software routine illustrated in FIG. 6.

The operation of the host computer 72 in determining the position of a touch on the touch panel 70 is illustrated in FIG. 6. During the initialization of the system, a scan cycle is performed for an untouched panel 70 with the X and Y amplitude values stored in the static RAM 92 for the times $t_{xo}$ and $t_{yo}$. During the initialization process the X and Y amplitude values for each sampled point in time $t_{xo}$ and $t_{yo}$ is read out from the static RAM 92 and stored in a RAM 101 of the host computer 72. After the initialization is performed, at a block 100 the host computer 72 sets the values of $t_{tx}$ and $t_{ty}$ equal to zero and the variables X and Y equal to 1. Thereafter, at block 102, the computer 72 calls a touch scan routine as shown in FIG. 7. The touch scan routine is a terminate and stay resident routine that is stored in the RAM 101 of the host computer 72. The host computer 72 in accordance with the touch scan routine at a block ⎯⎯ sets the automatic gain control value for the R.F. amplifier 82 for the X axis to the value determined upon initialization. Thereafter, at block 106 the host computer 72 initiates a scan burst for the X axis by instructing the controller 74. After the X axis values for times $t_x$ are stored in the static RAM 92, the computer 72 at a block 107 sets the automatic gain control value for the Y channel and at block 108 instructs the controller 74 to initiate a scan for the Y axis. After the Y axis values for times $t_y$ are stored in the static RAM 92, the computer 72 at block 110 reads each of the amplitude values stored for times $t_x$ and $t_y$ in the static RAM 92 into a terminate and stay resident area of the RAM 101. Thereafter at block 112, the computer 72 returns to the routine depicted in FIG. 6.

After the X and Y axis amplitude values for times $t_x$ and $t_y$ are read from the static RAM 92 into the RAM 101 of the host computer, the host computer 72 at block 114 determines a difference value $t_{xD}$ from the difference between the amplitude value stored for $t_x$ wherein x was initialized to 1 at block 100 and the amplitude value stored for $t_{xo}$ i.e. for x=1, $t_{10}$ where $At_{10}$ represents the amplitude value stored for the first sampled time during the initialization routine. Thereafter, at block 116 the computer determines whether the difference value $t_{xD}$ is greater than a threshold value and if it is, the computer 72 at block 118 determines whether the difference value $t_{xD}$ is greater than $D_x$ which represents the greatest difference value detected for the X axis. If $t_{xD}$ is greater than $D_x$ the computer 72 at block 120 sets $D_x$ equal to the difference value $t_{xD}$ and sets the time of occurrence $t_{tx}$ of the difference value equal to $t_x$. At block 122 the computer 72 increments x by one and if x is not greater than N, the number of sampled time points for the X axis, as determined by the computer 72 at block 124, the computer 72 returns to block 114 to determine the next difference value. After difference values are determined at block 114 for each point in time sampled by the analog to digital converter 88 and for which amplitude values are stored in the RAM 101, the computer 72 at block 126 determines whether $t_{tx}$, the time of occurrence of the greatest amplitude difference $D_x$, is equal to zero or not. If $t_{tx}$ is equal to zero indicating that no touch is detected on the X axis, the computer 72 exits the routine at a block 127. If however, the value of $t_{tx}$ is not equal to zero indicating a touch the time of occurrence of which is equal to $t_{tx}$, the computer 72 goes to block 128. At block 128, the computer 72 compares the amplitude stored at time $t_y$ to the initialization value stored for that same point in time $t_{y0}$ and stores the difference there between as $t_{yD}$. At block 130, the computer 72 compares $t_{yD}$ to a threshold and if $t_{yD}$ is greater than the threshold the computer 72 at block 132 compares $t_{yD}$ to $D_y$, the value of the greatest difference calculated at block 128 for the Y axis signal. Thereafter, at block 134 if $t_{yD}$ was determined to be greater than $D_y$ at block 132, the computer 72 at block 134 sets $D_y$ equal to $t_{yD}$ and the time of occurrence $t_{ty}$ of the greatest difference signal $D_y$ equal to $t_y$. At block 136 the computer 72 increments the variable y by one and at block 138 compares y to the number Z of sample points for the Y axis signal. If y is less than or equal to Z the computer 72 returns to block 128. If y is greater than Z indicating that a difference signal has been calculated for each sampled point on the Y axis, the computer 72 at block 140 determines the X and Y coordinates of a touch from the values of $t_{tx}$ and $t_{ty}$. Thereafter at block 142 the computer 72 exits the routine.

Figure 18:
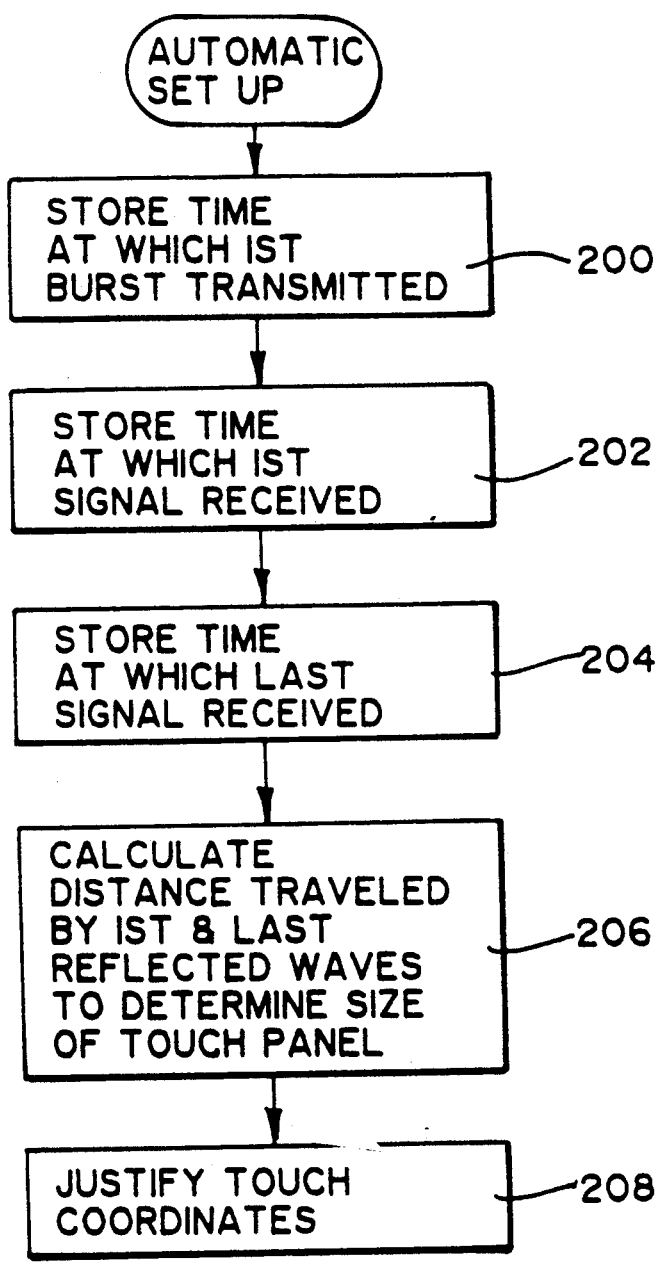
FIG. 18 is a flow chart illustrating an automatic set up program implemented by the computer shown in FIG. 5.

In accordance with the present invention, the size of the touch panel may also be automatically determined in accordance with the flow chart depicted in FIG. 18 so that touch panels of various sizes may be utilized with the same instruction set for controlling the microprocessor and the same electronics. Upon entering the automatic set up program, the computer 72 at block 200 instructs the controller 74 to apply a drive signal to the transmitting transducer 18 to cause a burst to be transmitted to the array 28, the computer 72 storing the time at which the first burst signal is transmitted. Thereafter, at block 202 the computer 72 stores the time at which the first signal is received by the receiver 20. At block 204 the computer 72 stores the time at which the last signal, generated in response to the first transmitted burst is received by the receiver transducer 20. The computer 72 then utilizes the velocity of the wave through the substrate 10, which is known, to calculate at block 206 the distance traveled by the first and last reflected waves from the times stored at block 200 in conjunction with the times stored at respective blocks 202 and 204. More particularly the computer 72 determines the size of the touch panel along the Y axis from the times stored at block 200 and 202. The computer 72 further determines the size of the touch panel along the X axis from the time stored at block 206 as well as the times stored at block 200 and 202. At block 208, the computer 72 utilizes the calculated size of the touch panel to automatically justify subsequently detected touch coordinates.

The reflective arrays 28, 30, 34 and 36 may be formed of metal and bonded on to the top surface 40 of the substrate 10. However, in the preferred embodiment of the present invention, the reflective arrays are formed by screening glass frits through a stencil on the top surface 40 of the substrate 10. The reflective array frits may be formed during the same cycle as the conductive frits used to bond the transducers to the substrate 10. As discussed above, each reflective element of the arrays 28, 30, 34 and 36 is disposed at a 45° angle with respect to its associated transducer 18, 20, 22 and 24. Preferably, the spacing between adjacent reflective elements along the array axis is equal to one wavelength of the shear wave imparted into the substrate 10 by the respective transducer. The reflective elements are preferably one half wavelength wide. Further, the width of each reflective array 18, 20, 22 and 24 is equal to the width of the transducer where the drive signal applied to the transducer is a sine wave, the number of cycles of which is substantially equal to the array width divided by a constant as discussed above. It has further been found that the number of reflective elements intersecting a line extending across the width of the array, i.e., a line perpendicular to the axis of the array, should be no less than N=14. This is because the zeroth order asymmetric Lamb wave phase velocity is approximately 7% less than Zohps at a substrate thickness to wavelength ratio of 1.48. Since it is desirable to have a response zero no further than 7% from the Zohps wavelength where the array response is defined by (sinNW)/(sinW), this implies a minimum N=1/0.07. Here W represents the wavelength of the Zohps wave.

In order to increase the ability of each reflective array 28, 30, 34 and 36 to discriminate between shear waves and Lamb waves, the number of reflectors in each array at right angles to the axis of the array is selected to be as high as possible since the quality of array discrimination is dependent upon the number of refle____ 'n a given acoustic path at right angles to the axis of the array. This is achieved by maintaining a spacing between the elements of one half wavelength along the axis array. In prior art surface acoustic wave sensors, in order to provide a constant power density of the surface acoustic waves reflected by the reflective arrays, a "reflective element withdrawal" method has been employed. This method increases the power reflectivity at points along the array as the distance between the points along the array and the respective transducer increases. The "reflective element withdrawal" method is such that selected reflective elements in the array are eliminated; however, this method diminishes the array's ability to discriminate between the wavelengths of different types of waves. Further the "reflective element withdrawal" method limits the size of a touch plate because the larger the plate the larger the spacings in the array and this ultimately results in non-overlapping reflective elements. In accordance with the preferred embodiment of the present invention, a different technique is employed to increase the power reflectivity at points along the array as the distance of the points along the array from the respective transducer increases wherein a variable height reflective array is provided as shown in FIG. 4. The height of each element in the reflective array is such that the power reflectivity per unit length of a reflective array, $\sigma(x)$ is given by the following (neglecting multiple reflection effects) eq. 2

$$\sigma(x) = \frac{\alpha}{(1 + \alpha/\sigma_L)(e^{\alpha(L-x)} - 1)} \qquad \text{eq. 2}$$

the ratio of the height of the array at x to the height of the first array element (x=o) is eq. 3

$$\frac{h(x)}{h(o)} = \left[ \frac{(1 + \alpha/\sigma_L)(e^{\alpha L} - 1)}{(1 + \alpha/\sigma_L)(e^{\alpha(L-x)} - 1)} \right]^{\frac{1}{2}} \qquad \text{eq. 3}$$

and the ratio of the heights of the last array element and the first array element is eq. 4

$$\frac{h(L)}{h(o)} = \left[ \frac{(1 + \alpha/\sigma_L)(e^{\alpha L} - 1)}{\alpha/\sigma_L''} \right]^{\frac{1}{2}} \qquad \text{eq. 4}$$

where $\alpha$ represents the power absorbtivity of the array per unit length, x is a variable representing the distance from the start of the array and L represents the length of the array. To design a variable height array, a practical value for the ratio of the maximum to minimum height, $h(L)/h(o)$, is determined and substituted into equation 4 to determine $\sigma_L$. Thereafter the values of h(o) and $\sigma_L$ are substituted into equation 3 to determine the height of the array as a function of distance. With variable height arrays, the waveforms shown in FIG. 8 are obtainable wherein the amplitude of the shear waves as reflected by the array elements is maintained substantially constant across the array in the absence of a touch.

Another technique to reduce spurious modes is to form the reflective elements of the arrays in such a way that the elements extend through the thickness of the substrate so as to minimize the amount of spurious modes for a given zohps mode reflectivity. This could be accomplished by etching slits in the substrate to the desired dimensions, and backfilling with glass frit or the like, to create reflective elements that extend through the thickness of the substrate.

A still further technique is to screen arrays on both the top and bottom surfaces of the substrate provided that the top and bottom reflective elements are aligned substantially vertical with each other. The vertical alignment of top and bottom reflective elements substantially eliminates the spurious anti-symmetric Lamb mode through cancellation, whereas the amplitude of the Zohps mode and the symmetric zeroth order Lamb mode are reinforced. In this manner, the ratio desired, (Zohps wave), to undesired, (Lamb wave), signal amplitude is increased by approximately a factor of two.

Figure 13:
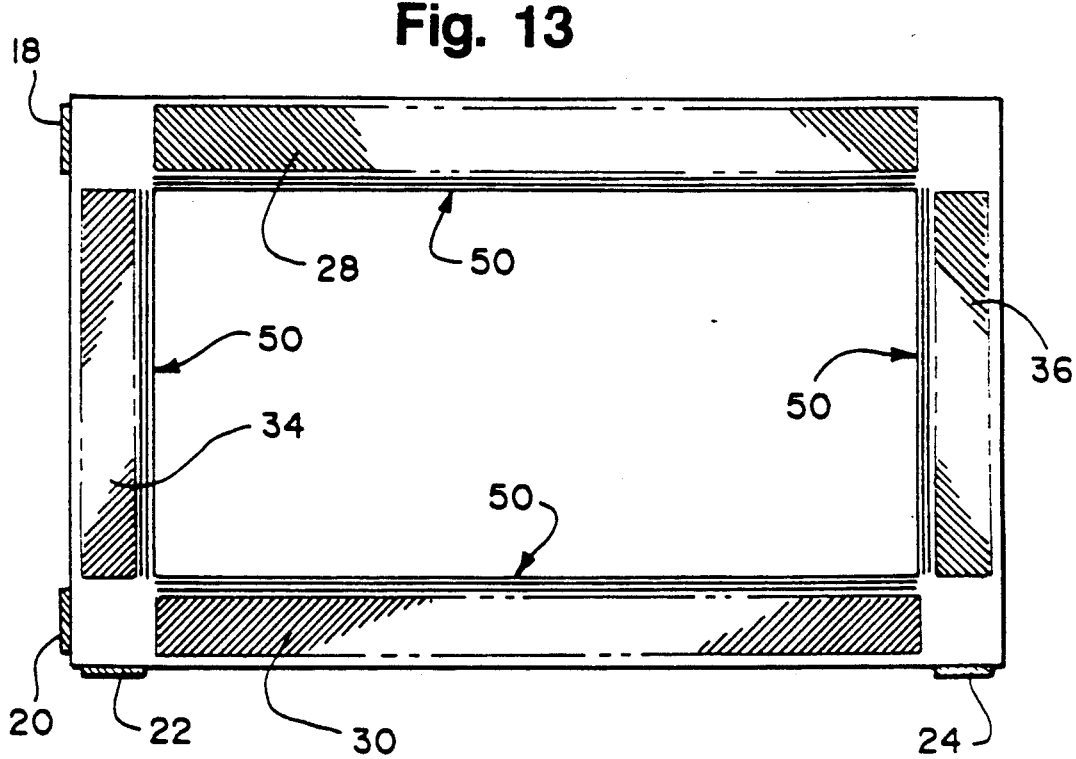
FIG. 13 is a top view of the touch position sensor shown in FIG. 3 with spurious mode sup-pressor reflectors disposed thereon.
Figure 14:
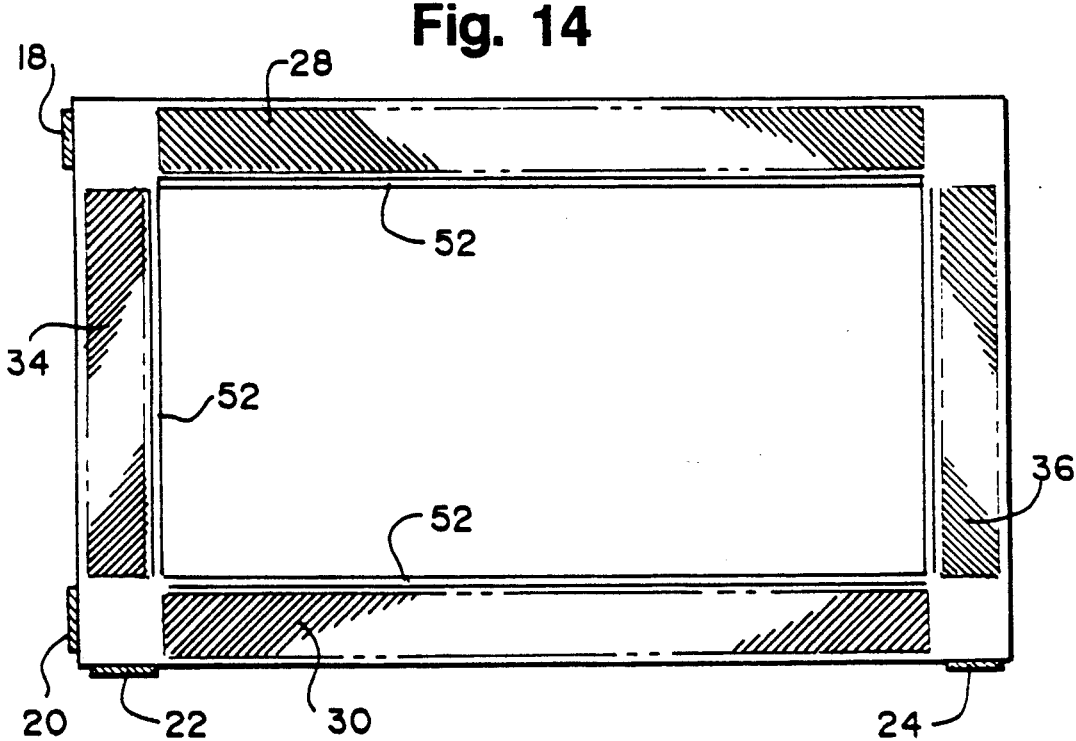
FIG. 14 is a top view of the touch position sensors shown in FIG. 3 with absorbing strips mounted thereon.

FIGS. 13 and 14 illustrate methods of further reducing Lamb wave interference. More particularly, in FIG. 13 spurious mode (Lamb wave) suppressor strip reflectors 50 are positioned adjacent to each of the reflective arrays 28, 30, 34 and 36, the strip reflectors 50 extending parallel to the axis of the associated array. The spacing between the reflector strips is selected to be equal to one quarter of a wavelength of the wave to be suppressed. In an alternative embodiment shown in FIG. 14, a strip of an absorbing material 52 is disposed adjacent to and in front of each of the reflective arrays 28, 30, 34 and 36 on both the top surface 40 and the bottom surface 42 of the substrate 10 in order to absorb spurious Lamb wave energy. Lamb waves are preferentially absorbed with respect to Zohps, and virtual extinction of residual Lamb can be accomplished with negligible attenuation of the Zohps mode. Effective absorbing strips can be formed from epoxies, silicones, and the like. The absorbing strips may be screened on or absorbing tape may be used. The width of the absorbing strips are preferably no more than 25% of the array width or 3 mm. according to the present embodiment. For particular applications the touch panel is required to be affixed to an overlying rim or bezel with a sealant, in which case the sealant itself may act as the upper absorbing strips.

Figure 17:
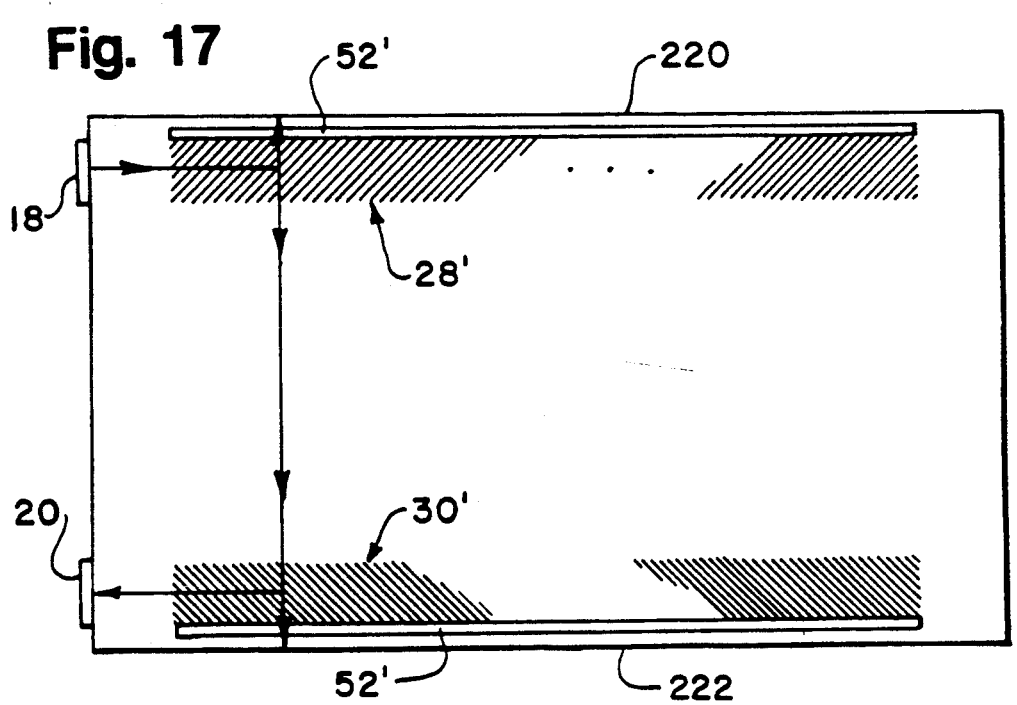
FIG. 17 is a top view of another embodiment of the touch position sensor in accordance with the present invention.

In applications where a rim or bezel is required to extend about the periphery of the touch panel, the rim or bezel may be limited in width so that it cannot mask both the reflective arrays and absorbing strips from the viewing area of the display. A very effective embodiment that alleviates this problem is shown in FIG. 17. Here the reflective elements in the arrays 28 and 30 are rotated by 90 degrees with respect to the arrays 28 and 30 shown in FIG. 3. The Zohps wave is now reflected outward onto the adjacent edge 220 of the substrate which serves as a highly efficient reflecting element to redirect the wave energy across the substrate to the opposing edge 222. Upon edge reflection, the wave passes through the array 28, a fraction of the wave power being diverted to the left. The opposing edge 72 reflects the waves to the receiving array 30 which in turn directs the waves into the receiving transducer 20, a comparable fraction of energy being diverted to the right by the receiving array when the wave passes through. The purpose of this embodiment is that it allows absorbing tape 52 to be placed at the back of the arrays 28 and 30 close to the edges 220 and 222 on both top and bottom surfaces of the substrate 10, thereby freeing up space at the front of the array. The reflecting path traverses each absorbing strip twice, towards and away from the strip, hence the strips are approximately twice as effective and can be reduced in width as a consequence. In practice, the function of the absorbing strips may be incorporated into the tape which confines the t_____ _itting and receiving cables to the edge of the substrate. The discrimination of Zohps to spurious Lamb modes is further enhanced by the action of the arrays which selectively strip a greater proportion of Lamb waves out of the signal path, on passing through the arrays after edge reflection. It is noted that only two arrays 28 and 30 are shown in FIG. 17 for simplicity. The reflective elements in the arrays shown in other figures depicting additional embodiments of the present invention may also be rotated by 90° as will be apparent to one skilled in the art.

It has further been found that a plastic sheet having an optical coating to eliminate or minimize reflection may be laminated to the bottom surface of the substrate 10 to reduce panel optical glare by 50%. A suitable plastic sheet with a HEA coating is manufactured by OCLI. Use of such a plastic sheet may eliminate the need for Lamb mode absorbers and tempered glass.

Figure 20:
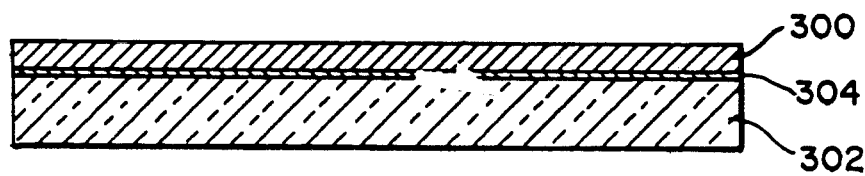
FIG. 20 is a cross section of a laminated touch panel for use in the touch position sensor of the present invention.

A laminated touch panel may also be employed to increase the thickness of the touch panel while still ensuring that the touch panel can support shear waves for propagation therein. Preferably the thickness of the substrate 10 or a substrate 300 as shown in FIG. 20 is less than two times the wavelength of the Zohps wave, i.e., imparted into the substrate so as to avoid excessive higher order modes or overtones. Further, the thickness of the substrate 10, 300 should not be very close to one wavelength of the shear wave imparted into the substrate. This is because when the ratio of the substrate thickness to shear wave wavelength is approximately one, a practical array of reflective elements, i.e., one that has a finite number of elements, can not reject spurious Lamb waves. This is because at a ratio of approximately one, the phase velocity of the first order symmetric Lamb wave is approximately equal to that of the Zohps mode and the array can not discriminate between the Zohps wave and that spurious Lamb wave. Therefore the preferred thickness of the substrate 10, 300 is less than 0.9 times the shear wave wavelength or greater than 1.1 times the wavelength but less than two times the wavelength.

In order to provide a touch panel that is greater than two times the wavelength of the shear wave imparted into the substrate, the substrate 10, 300 may be bonded to a back plate wherein there is no substantial absorption or coupling of the Zohps wave by the back plate as mentioned above. A suitable laminated touch panel as shown in FIG. 20 may be formed by bonding a back plate 302 to the substrate 300 utilizing A nonshear wave coupling adhesive 304. A suitable nonshear wave coupling adhesive may be an adhesive that remains liquid-like after cure for example a silicone rubber adhesive. Such adhesives may be clear which can be important for various applications. It appears that such a liquid-like adhesive can not support shear waves and that shear wave energy does not radiate into the adhesive if mode conversion involving compressional components is absent. Boundary layer absorption appears to be the only mechanism for energy loss.

A laminated touch panel may also be formed by bonding the substrate 300 to a back plate 302 wherein the velocity at which an acoustic wave travels in the back plate 302 is greater than the velocity at which an acoustic wave travels in the substrate 300. In this later embodiment, the adhesive need not be nonshear wave coupling but may be frit for example. It appears that in this embodiment, the interface between the back plate 302 and the substrate 300 traps the wave energy so that shear waves propagating in the substrate are not coupled to the back plate. It is noted that in any of the above mentioned laminated embodiments of the touch panel, the back plate may be formed of glass, plastic, metal or a ceramic and depending upon the embodiment, the back plate may be formed of the same or a different material as compared to the substrate.

Figure 10:
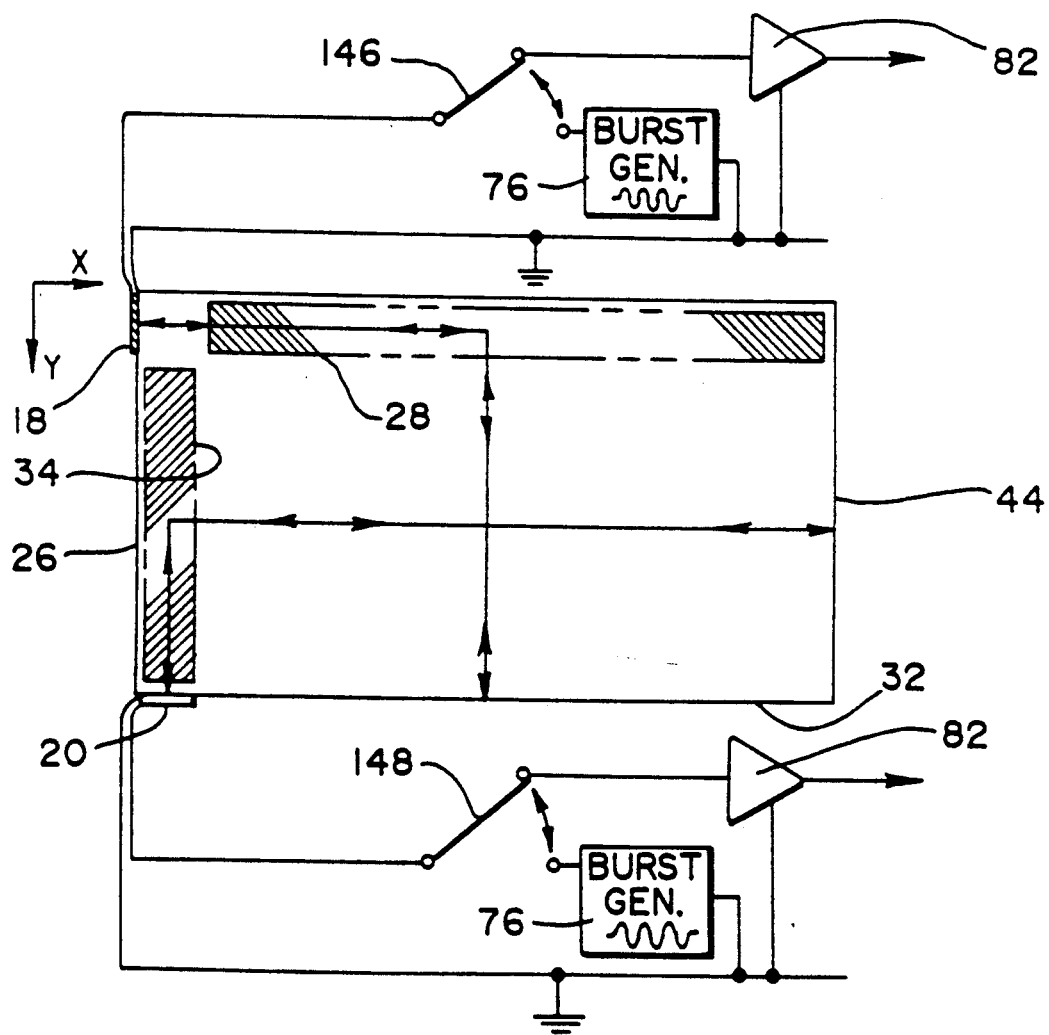
FIG. 10 is a top view of a second embodiment of the touch position sensor in accordance with the present invention.

A second embodiment of the touch position sensor of the present invention is shown in FIG. 10 and includes a single transducer for transmitting and receiving the shear waves associated with each axis, the coordinates of a touch on which is to be determined. Further, instead of having two reflective arrays for each axis as the embodiment depicted in FIG. 3, the touch position sensor shown in FIG. 10 includes a single reflective array 28, 34 for each axis wherein the side 32, 44 of the substrate 10 opposite to each array 28, 34 is machined to provide a reflective edge. Because shear waves reflect with high efficiency, the reflective edge 32 and 44 of the substrate 10 reflects the shear waves propagating perpendicular thereto without any appreciable loss in energy.

More particularly, the transducer 18 is coupled to a transmit/receive switch 146 that is controlled by the controller 74 to couple the X driver 76 or burst generator to the transducer 18 during a first time period to apply the drive signal thereto. The transducer 18 is responsive to the drive signal to impart a shear wave into the substrate 10 that propagates along the axis of the array 28. The reflective elements of the array 28 reflect portions of the shear wave incident thereto across the substrate 10 in the Y direction to the reflective edge 32 of the substrate 10. The substrate edge 32 reflects the shear waves propagating perpendicular thereto back to the reflective array 28 which in turn reflects the shear waves back to the transducer 18. After the drive signal is applied to the transducer 18, the controller changes the state of the transmit/receive switch 146 to the receive position wherein the transducer 18 is coupled to the R.F. amplifier 82 so that shear waves sensed by the transducer are coupled to the position detection circuitry.

Similarly, the transducer 20 is coupled to a transmit/receive switch 148 that is controlled by the controller 74 to couple the Y driver 76 to the transducer 20 during a second time period to apply the drive signal thereto. The transducer 20 is responsive to the drive signal to impart a shear wave into the substrate 10 that propagates along the axis of the array 34. The reflective elements of the array 34 reflect portions of the shear wave incident thereto across the substrate 10 in the X direction to the reflective edge 44 of the substrate 10. The substrate edge 44 reflects the shear waves propagating perpendicular thereto back to the reflective array 34 which in turn reflects the shear waves back to the transducer 20. After the drive signal is applied to the transducer 20, the controller changes the state of the transmit/receive switch 148 to the receive position wherein the transducer 20 is coupled to the R.F. amplifier 82 so that shear waves sensed by the transducer are coupled to the position detection circuitry.

In order to prevent a portion of the shear wave traveling along the array 28 from being reflected off the edge 44 opposite the transducer 18 during the measurement interval, the touch panel shown in FIG. 10 may be modified as shown in FIG. 20 such that the edge 45 of the substrate adjacent to the end 47 of the array 28 is at a 45° angle with respect to the axis of the array 28. Similarly, the edge 49 is at a 45° angle with respect to the axis of the array 34. In this embodiment, absorbing material 52 may be placed on the top and bottom surfaces of the substrate adjacent to the edge 32, 44 of the substrate opposite to the respective array 28, 34. This position of the absorbing material increases the useable touch area of the touch position sensor. Absorbing material 52 may further be disposed on the edges 26, 32, 43 and 44 to absorb spurious waves reflected off of these edges. However, no absorbing material should be disposed on the angled edges 45 and 49. To further minimize spurious waves which may be generated at the interface between the transducer and substrate, absorbing tape may be placed in front of the transducers on the top and bottom surfaces of the substrate and/or copper foil 53 with adhesive ends 55 may be wrapped around the transducers. More particularly, the copper foil 53 wraps around each transducer 18 and 22 wherein the ends 55 of the foil adhere respectively to the top and bottom surfaces of the substrate immediately adjacent to the plate edge on which the transducer is mounted. The copper foil provided with a ground connection creates a shield to reduce electrical interference and further acts as a portion of the absorbing material that extends about the periphery of the plate. It is further noted that the arrays 28 and 34 need not be formed on the same top or bottom surface of the substrate. For example, the substrate 28 can be formed on a top surface of the substrate while the reflective array is formed on a bottom surface of the substrate. Such an arrangement may provide advantages such as ease of manufacturing, etc.

Figure 11:
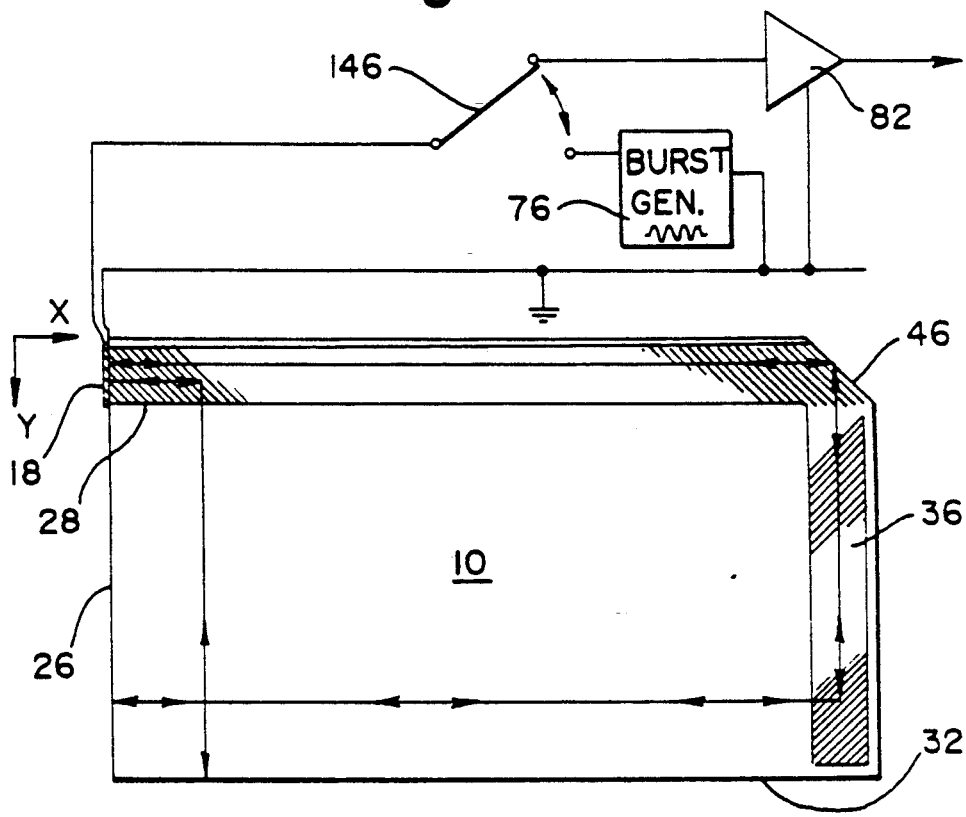
FIG. 11 is a third embodiment of the shear wave touch position sensor in accordance with the present invention.
Figure 12:
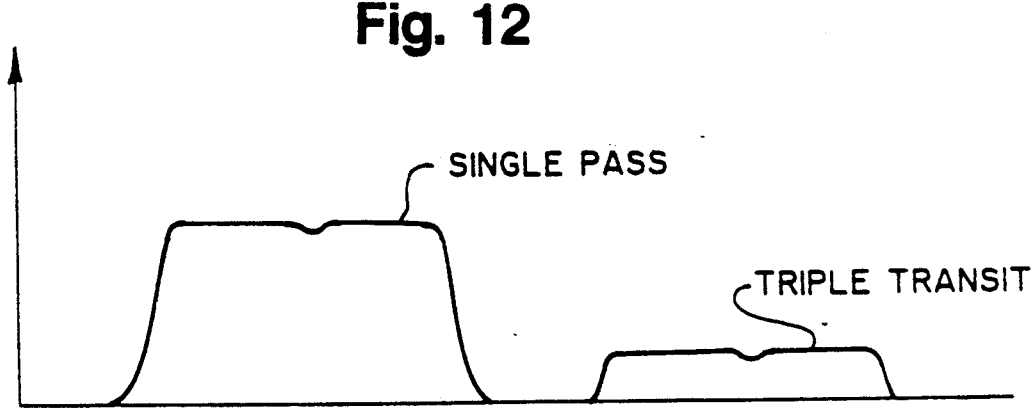
FIG. 12 is a graph illustrating the waveform generated by the sensor shown in FIG. 11 as compared to the waveform generated by the sensor shown in FIG. 3.
Figure 19:
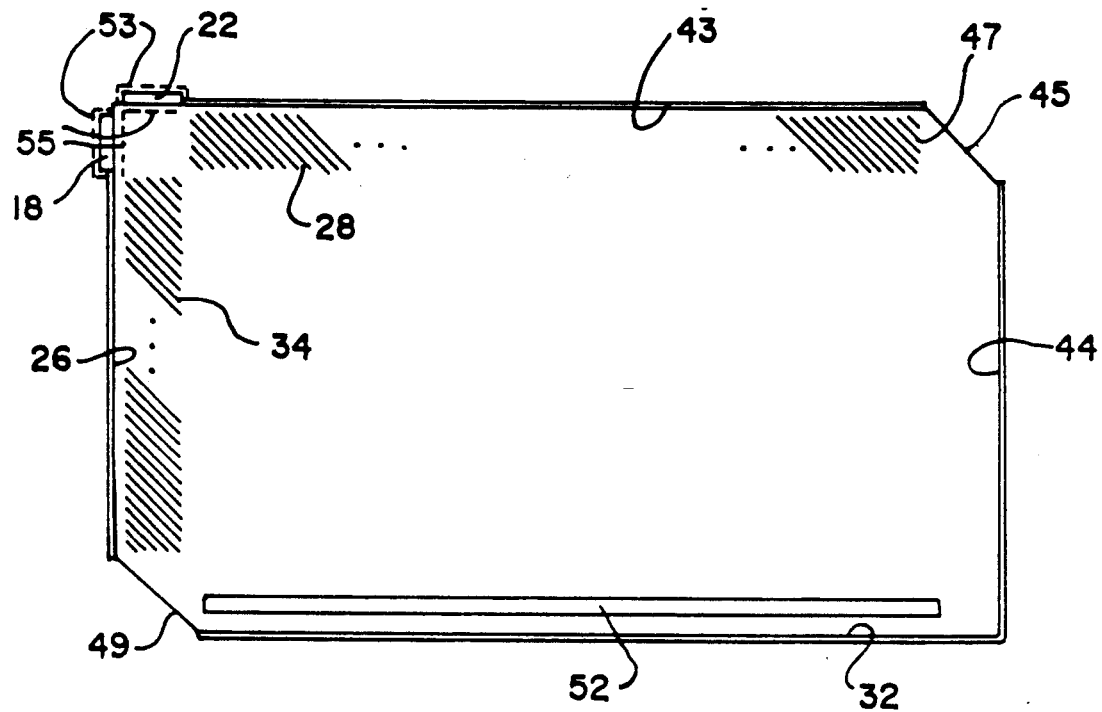
FIG. 19 is a top view of another embodiment of the touch position sensor in accordance with the present invention.

A third embodiment of the touch position sensor of the present invention is shown in FIG. 11 and includes a single transducer for transmitting and receiving the shear waves associated with two perpendicular axes the coordinates of a touch on which are to be determined. In this embodiment, two reflective arrays are employed, a first reflective array 28 extending along an axis perpendicular to the side 26 on which the transducer 18 is mounted and a second reflective array 36 extending along an axis perpendicular to the axis of the first array 28 and adjacent to the end of the array 28. In order to couple a shear wave propagating along the axis of the reflective array 28 to the reflective array 36, the corner of the substrate 10 intersecting the axes of the arrays 28 and 36 is cut in order to provide a reflective edge 46 that is disposed at a 45° angle with respect to the adjacent sides 44 and 48 of the substrate 10. In response to a drive signal from the driver 76, the transducer 18 imparts a shear wave into the substrate 10 that propagates along the axis of the array 28. The reflective elements of the array 28 reflect portions of the shear wave along a plurality of paths parallel to the Y axis to the side 32 of the substrate 10 wherein the side 32 is machined to provide a reflective edge. The side 32 of the substrate 10 reflects the shear waves propagating perpendicular thereto back to the array 28 which in turn reflects the shear waves from the side 32 back to the transducer 18. When the shear wave propagating along the axis of the reflective array 28 meets the reflective edge 46, the edge 46 reflects the shear wave along the axis of the second array 36. The elements of the second array 36 reflect portions of the shear wave along parallel paths across the substrate in the −X direction to the opposite side 26 of the substrate 10 which is machined to provide a second reflective edge. The substrate side 26 reflects the shear waves propagating perpendicular thereto back to the second reflective array 36 which in turn reflects the shear waves to the reflective edge 46. The reflective edge 46 then reflects the shear waves back to the transducer 18. The transducer 18 senses the shear waves reflected back and provides a signal representative thereof. This mode of operation is designated the triple transit mode. In the triple transit mode, the amplitude of the signal provided by the transducer 18 is reduced as compared to the amplitude of a signal generated by the transducer 20 as shown in FIG. 3, this difference in amplitude being depicted in FIG. 12. It is noted, that in the preferred embodiment the transducer 18 is positioned on the side of the substrate 10 that is perpendicular to the axis of the longest reflective array so that there are no overlapping path lengths associated with the X array and the Y array. Further, in the preferred embodiment, the edge 32 is modified so that the portion of the edge 32 adjacent to the end of the array 36 is at a 45° angle with respect to the axis of the aray 36 as discussed above with respect to FIG. 19.

Figure 15:
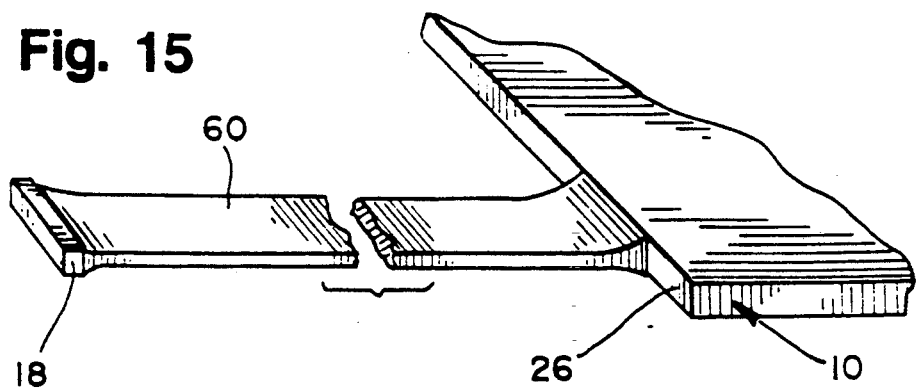
FIG. 15 is a partial perspective view of a shear wave propagating substrate coupled by an elongated flexible connector to a transducer.
Figure 16:
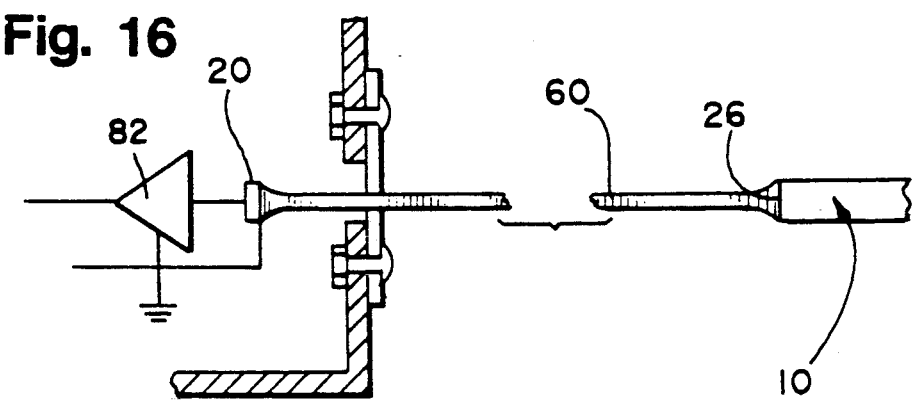
FIG. 16 is a side view of the transducer, substrate and connector illustrated in FIG. 15 wherein the transducer is shielded.

FIGS. 15 and 16 illustrate a flexible connector 60 that forms a Zohps mode transmission line. More particularly, the flexible connector 60 is formed of metal wherein the thickness of the connector bonded to the substrate 10 is equal to the thickness of the substrate, the thickness of the connector 60 reducing to a desired thinness a short distance from the edge of the substrate to which the connector is bonded, the distance being on the order of a few wavelengths of the Zohps wave. This embodiment has the advantage that there are no transducers or electrical wiring in the vicinity of the touch plate or substrate 10 so that the transducers may be brought inside the controller through a slit or the like in the wall of the controller's housing. Because the transducers are remote from the touch plate 10 electromagnetic radiation may be shielded from the transducer thus reducing pickup. Further, any radiation emanating from the transducer may be similarly shielded from external pickup. The flexible connector strip may be made as thin as 5 mils. Further a plastic sheathing may cover the connector 60 since the sheathing will not significantly dampen the Zohps wave propagating therein.

Since changes may be made in the above described apparatus without departing from the scope of the present invention, it is intended that the above description and drawing be interpreted as illustrative and not in a limiting sense.

What is claimed and desired to be secured by Letters Patent is:

1. A touch panel for use in a touch position sensor having at least one transducer mounted on said touch panel to impart a shear wave of a given wavelength for propagation in said touch panel, comprising:
   a touch substrate capable of supporting shear waves for propagation therein, the thickness of said touch substrate being less than two times the wavelength of the shear wave to be imparted therein and greater than or less than one wavelength of said shear wave; and
   at least one array of reflective elements disposed along an axis, each element of said array being positioned at an approximately 45° angle with respect to said array axis.

2. A touch panel for use in a touch position sensor as recited in claim 1 wherein said substrate is formed of glass.

3. A touch panel for use in a touch position sensor as recited in claim 1 wherein said substrate is formed of a plast...

4. A touch panel for use in a touch position sensor as recited in claim 1 wherein said substrate is formed of metal.

5. A touch panel for use in a touch position sensor as recited in claim 1 wherein said substrate is formed of a ceramic.

6. A touch panel as recited in claim 1 for use in a touch position sensor including one transducer for transmitting a shear wave for propagation in a first direction along said array axis and for receiving a shear wave propagating along said axis in a second direction opposite to said first direction wherein said substrate has a first edge for mounting said transducer adjacent to a first end of said array and said substrate has a second edge adjacent to a second end of said array and opposite said first array end, said second substrate edge being reflective and at an approximately 45° angle with respect to said array axis.

7. A touch panel for use in a touch position sensor as recited in claim 1 wherein the thickness of said touch substrate is less than approximately 0.9 times the wavelength of the shear wave to be imparted therein or is greater than approximately 1.1 times the wavelength of the shear wave to be imparted therein.

8. A touch panel for use in a touch position sensor as recited in claim 1 wherein said array of reflective elements includes a first array of reflective elements disposed on a top surface of said substrate and a second array of reflective elements disposed on a bottom surface of said substrate, the reflective elements of said array being vertically aligned.

* * * * *

UNITED STATES PATENT AND TRADEMARK OFFICE
CERTIFICATE OF CORRECTION

PATENT NO.   :   5,243,148
DATED        :   September 7, 1993
INVENTOR(S)  :   Knowles It is certified that error appears in the above-identified patent and that said Letters Patent is hereby corrected as shown below:

On the title page, after item (73), insert item [*] Notice:
The portion of the term of the patent disclaimed, as shown on the first page of the patent, should be changed from "Jan. 5, 2000" to -- Jan. 5, 2010 --.

Signed and Sealed this

Twentieth Day of September, 1994

Attest:

BRUCE LEHMAN

Attesting Officer  Commissioner of Patents and Trademarks